(12) United States Patent
Woo (10) Patent No.: US 10,166,979 B2
(45) Date of Patent: Jan. 1, 2019

(54) PARKING ASSIST SYSTEM AND METHOD

(71) Applicant: MANDO CORPORATION, Pyeongtaek-si, Gyeonggi-do (KR)

(72) Inventor: Hyeong Min Woo, Seongnam-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 15/794,809

(22) Filed: Oct. 26, 2017

(65) Prior Publication Data

US 2018/0111609 A1   Apr. 26, 2018

(30) Foreign Application Priority Data

Oct. 26, 2016   (KR) .................. 10-2016-0139844

(51) Int. Cl.
  *G06K 9/00* (2006.01)
  *B60W 30/06* (2006.01)
  *B60W 30/18* (2012.01)

(52) U.S. Cl.
  CPC ...... *B60W 30/06* (2013.01); *B60W 30/18036* (2013.01); *G06K 9/00805* (2013.01); *G06K 9/00812* (2013.01); *B60R 2300/806* (2013.01); *B60R 2300/8066* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 2015/0375741 | A1* | 12/2015 | Kiriya | G06K 9/00355 701/2 |
| 2016/0272244 | A1* | 9/2016 | Imai | G08G 1/166 |
| 2017/0096102 | A1* | 4/2017 | Nallapa | B60Q 9/002 |

* cited by examiner

*Primary Examiner* — Thomas S McCormack
(74) *Attorney, Agent, or Firm* — McDermott Will & Emery LLP (57) ABSTRACT

The present disclosure provides a parking assist system including: a rear object recognizer that recognizes a rear object existing behind a vehicle through rear sensors; a reversing controller that controls the vehicle to reverse until an entry rate to the parking space becomes a first reference value or more, and ends reversing control when a distance between the vehicle and the rear object becomes less than a second reference value; a rear object position storage that stores position information of the rear object and increases a count when the reversing control is ended on the basis of the distance between the vehicle and the rear object; and a system terminator that ends parking control when the position information of the rear object before and after the count is increased is substantially the same.

11 Claims, 6 Drawing Sheets

PARKING ASSIST SYSTEM AND METHOD

CROSS REFERENCE TO RELATED APPLICATION

This application claims priority from Korean Patent Application No. 10-2016-0139844, filed on Oct. 26, 2016, which is hereby incorporated by reference for all purposes as if fully set forth herein.

BACKGROUND OF THE INVENTION

1. Field of the Invention

The present disclosure relates to a parking assist system and method.

2. Description of the Prior Art

A parking assist system is a system that assists a driver to park by controlling movement of a vehicle to fit to a parallel or perpendicular parking condition, depending on parking spaces.

When a parking space is formed in a perpendicular parking type, a vehicle can be parked in any one of head-in parking or back-in parking. Assuming back-in parking, a parking assist system can park a vehicle by advancing the vehicle ahead of a parking space and then reversing the vehicle.

If there is an object in the parking space in this process of parking, the parking assist system may attempt to park in the way of stopping reversing to avoid the object, correcting the position of the vehicle by advancing the vehicle, and then reversing again.

However, if there is an obstacle that has not been found in the initial process of searching for a parking space, there may be a situation that it is impossible to park a vehicle in the parking space even if repeating advancing and reversing to correct the position of the vehicle.

This situation frequently occurs particularly in the parking lot of a shopping center where carts are left in parking spaces in many cases or when an animal or a person rushes into a parking space.

In this case, a parking assist system may make a driver uncomfortable by repeating advancing control and reversing control despite that it is impossible to park due to an obstacle in a parking area.

Further, a parking system repeats advancing and reversing several times to park a vehicle also when there is a person or an animal in a parking space, which may act as a factor making a driver anxious.

SUMMARY OF THE INVENTION

Under this background, an objective of the present disclosure is to provide a technology that ends parking when an object is recognized and it is difficult to park due to the object.

In order to achieve the objective, an aspect of the present disclosure provides a parking assist system including: a rear object recognizer that recognizes a rear object existing behind a vehicle through rear sensors; a reversing controller that controls the vehicle to reverse until an entry rate to the parking space becomes a first reference value or more, and ends reversing control when a distance between the vehicle and the rear object becomes less than a second reference value; a rear object position storage that stores position information of the rear object and increases a count when the distance between the vehicle and the rear object is less than the second reference value and the reversing control is ended; and a system terminator that ends parking control when the position information of the rear object before and after the count is increased is substantially the same.

Another aspect of the present disclosure provides a parking assist method including: searching for a parking space through side sensors; controlling a vehicle to reverse until an entry rate to the parking space becomes a first reference value or more; recognizing a rear object in the parking space through rear sensors; ending reversing control when a distance between the vehicle and the rear object becomes less than a second reference value; storing position information of the rear object and increasing a count at the point of time where the reversing control is ended, when the distance between the vehicle and the rear object is less than the second reference value and the reversing control is ended; comparing position information of the rear object before and after the count is increased; and ending parking control when the position information of the rear object before and after the count is increased is substantially the same in the comparing of position information of the rear object.

According to the present disclosure described above, when an object that obstructs completion of parking in a parking space is recognized and parking is difficult due to the object, parking can be ended early.

Accordingly, it is possible to remove the problem where repeated advancing control and reversing control make a driver uncomfortable. Further, it is possible to remove the problem where repeated advancing and reversing of the vehicle make nearby pedestrians uncomfortable.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
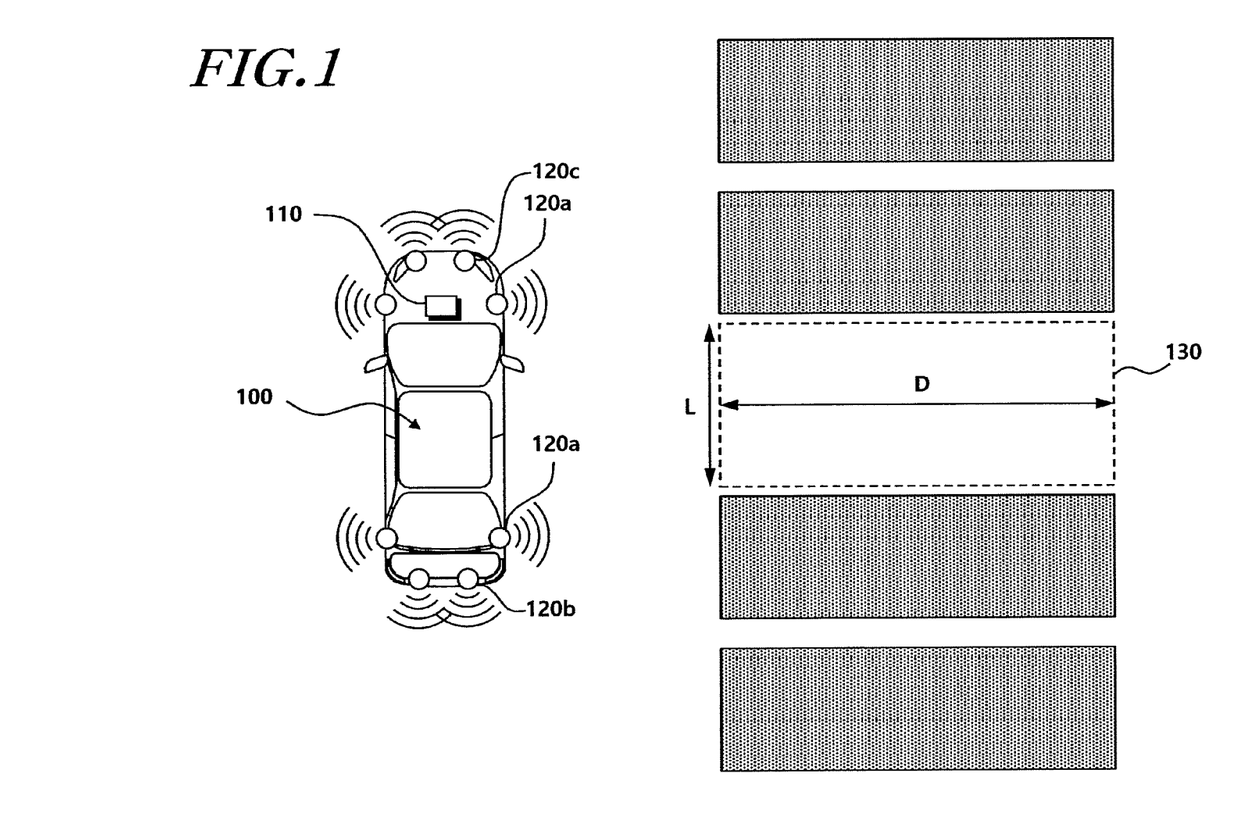
FIG. 1 is a diagram showing a vehicle according to an embodiment of the present disclosure searching for a parking space.

FIG. 1 is a view showing a vehicle according to an embodiment of the present disclosure searching for a parking space.

Referring to FIG. 1, a vehicle 100 may include a plurality of sensors 120a, 120b, and 120c.

The sensors 120a, 120b, and 120c can sense the distance from an object or the position of the object.

The sensors 120a, 120b, and 120c may be ultrasonic sensors, radar sensors, light detection and ranging (LiDAR) sensors, or camera sensors.

The vehicle 100 can search a parking space 130 between objects by sensing the distance between the objects (particularly, corners of the objects) or the positions of the objects through the sensors 120a, 120b, and 120c.

The sensors 120a, 120b, and 120c may include front sensors 120c at the front of the vehicle 100, side sensors 120a at the sides, and rear sensors 120b at the rear. In particularly, the vehicle 100 can search the parking space 130 using the side sensors 120a.

Obviously, the positions of the sensors may be changed in various ways, and when the sensors are radar sensors, any one or more of front radar sensors at the front of the vehicle, rear side radar sensors at the sides or the corners of the rear sides of the vehicle, and rear radar sensors at the rear of the vehicle may be used, and ultrasonic sensors may be used instead of the radar sensors as the rear sensors.

When searching for the parking space 130, the vehicle 100 can measure the width L of the parking area 130 by recognizing the corners of surrounding objects. When the width L is larger than the width of the vehicle 100, the vehicle 100 can recognize the parking space 130 as a space where parking is possible.

When searching for the parking space 130, the vehicle 100 can measure the depth D of the parking area 130. The depth D of the parking space 130 may be the distance to a side of the parking space 130, and when the depth D of the parking space 130 is larger than the length of the vehicle 100, the vehicle 100 can recognize the parking space 130 as a space where parking is possible.

After searching for the parking space 130, the vehicle 100 can assist in parking by controlling its movement.

Searching for the parking space 130 and controlling movement of the vehicle 100 may be performed by a parking assist system (PAS) 110.

The parking assist system stated in this embodiment is a concept including both of a fully automatic parking system and a semi-automatic parking system.

The fully automatic parking system means a system that drives a vehicle into a parking space even without operation by a driver by automatically performing steering control, engine control, and shifting control of a vehicle through a controller.

Further, the semi-automatic parking system is a system in which a system controller performs only steering control and engine control without controlling shifting for advancing/reversing. Accordingly, a driver shifts (for advancing and reversing) and the system controller may output guide messages for shifting (changing gears) to the driver during parking.

Figure 2:
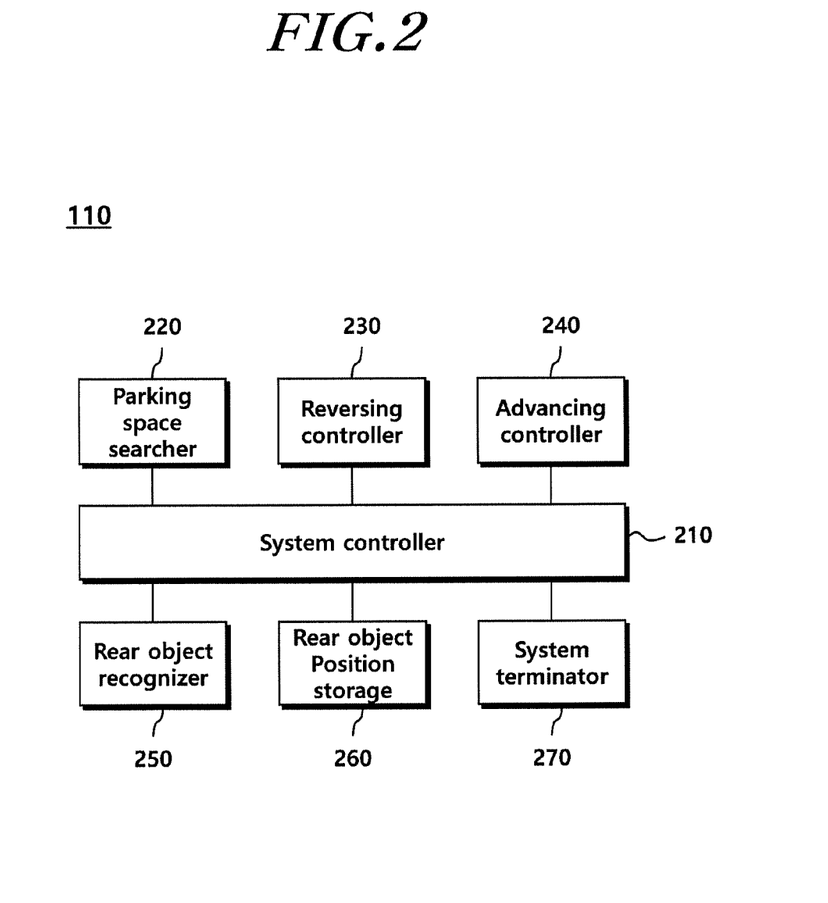
FIG. 2 is a diagram showing the configuration of a parking assist system according to an embodiment of the present disclosure.

FIG. 2 is a diagram showing the configuration of a parking assist system according to an embodiment of the present disclosure.

A parking assist system 110 may include a system controller 210, a parking space searcher 220, a reversing controller 230, an advancing controller 240, a rear object recognizer 250, a rear object position storage 260, and a system terminator 270.

The system controller 210, which controls the overall function of the parking assist system 110, can control operation and stop of the parking space searcher 220, the reversing controller 230, the advancing controller 240, the rear object recognizer 250, the rear object position storage 260, and the system terminator 270 that are separate components. For example, the system controller 210 can control the vehicle 100 to reverse by controlling the reverse controller 230 and can control the vehicle 100 to advance by controlling the advancing controller 240. The parking space searcher 220 searches for the parking space 130 through one or more of the sensors 120a, 120b, and 120c, for example, the side sensors 120a. In order to search the parking space 130, it may be possible to use only the left side sensor, the right side sensor, or both of the left and right side sensors, depending on setting or necessity, and the rear sensors 120b may be additionally used, if necessary.

Such searching of a parking space using various sensors can be achieved by technologies that are well known in the art, so the detailed configuration is not described herein.

When the parking space searcher 220 searches for the parking space 130, the system controller 210 can move the vehicle 100 into the parking space 130 by sequentially controlling one or more times the reversing controller 230 and the advancing controller 240.

That is, when the parking space searcher 220 creates a parking path for the searched parking space 130, the system controller 210 can control the reversing controller 230 and the advancing controller 240 so that the vehicle 100 moves along the parking path.

The reversing controller 230 performs a basic operation for reversing the vehicle when the parking space searcher finishes searching for the parking space or the advancing controller finishes advancing control.

The reversing controller 230 according to this embodiment, other than the basic operation, controls the vehicle to reverse until an entry rate to the parking space becomes a first reference value or more, but if the distance between the vehicle and a rear object is less than a second reference value, it ends the reversing control.

The advancing controller 240 controls the vehicle to advance when the reversing control is ended due to the condition that the distance between the vehicle and the rear object is less than the second reference value and the position information of the rear object changes after a count is increased.

The parking space searcher 220 can calculate the depth of the parking space and the reversing controller 230 can calculate the entry rate to the parking space using the ratio of the entry distance of the vehicle to the depth of the parking space.

The rear object position storage 260 stores the position information of a rear object and increases the count of a counter when reversing control based on the distance between the vehicle and a rear object is ended. The rear object position storage 260 may reset the count and the position information of a rear object before and while a parking space is searched.

The system terminator 270 ends parking control when the position information of a rear object is not changed before and after the count is increased.

Ending of parking control means inactivating the parking assist system, which may be the same meaning as turning off the parking assist system.

Further, though not shown, the parking assist system 110 according to the embodiment may further include a counter. The counter is used to count the number of times of ending of reversing control due to a rear object or the number of times of storing/updating position information of a rear object with ending of the reversing control.

The operations of the rear object position storage 260 and the system terminator 270 are described in detail hereafter.

Figure 3:
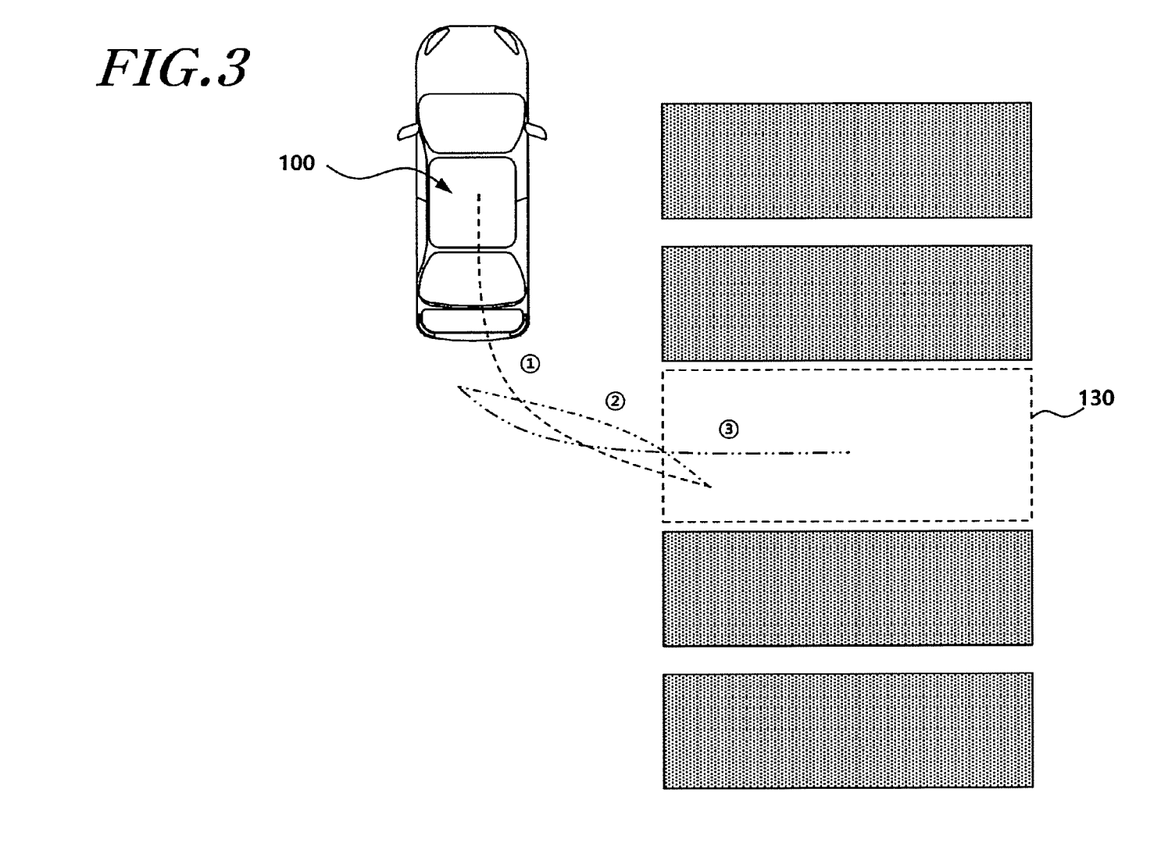
FIG. 3 is a diagram showing an example of a parking path.

FIG. 3 is a diagram showing an example of a parking path.

Referring to FIG. 3, for perpendicular parking and back-in parking, the parking assist system 110—for example, the system controller 210—can park in the parking space 130 through first reversing □, first advancing □, and second reversing □ after driving a vehicle 100 ahead of the parking space 130.

When a rear object that is an obstacle exists within a predetermined distance behind the vehicle 100, the parking assist system 110 can end reversing the vehicle 100.

Referring to FIG. 2 again, the parking assist system 110 includes the rear object recognizer 250 and the rear object recognizer 250 can recognize rear objects existing behind the vehicle 100 through the rear sensors 120b. The reversing controller 220 controls the vehicle 100 to reverse, and can end revering control when the rear object recognizer 250 recognizes a rear object during reversing control and the distance between the rear object and the vehicle 100 decreases under a second reference value, for example, 30 cm.

Then, the parking assist system 110 can correct the position of the vehicle 100 by advancing the vehicle 100 and then reversing again.

Figure 4:
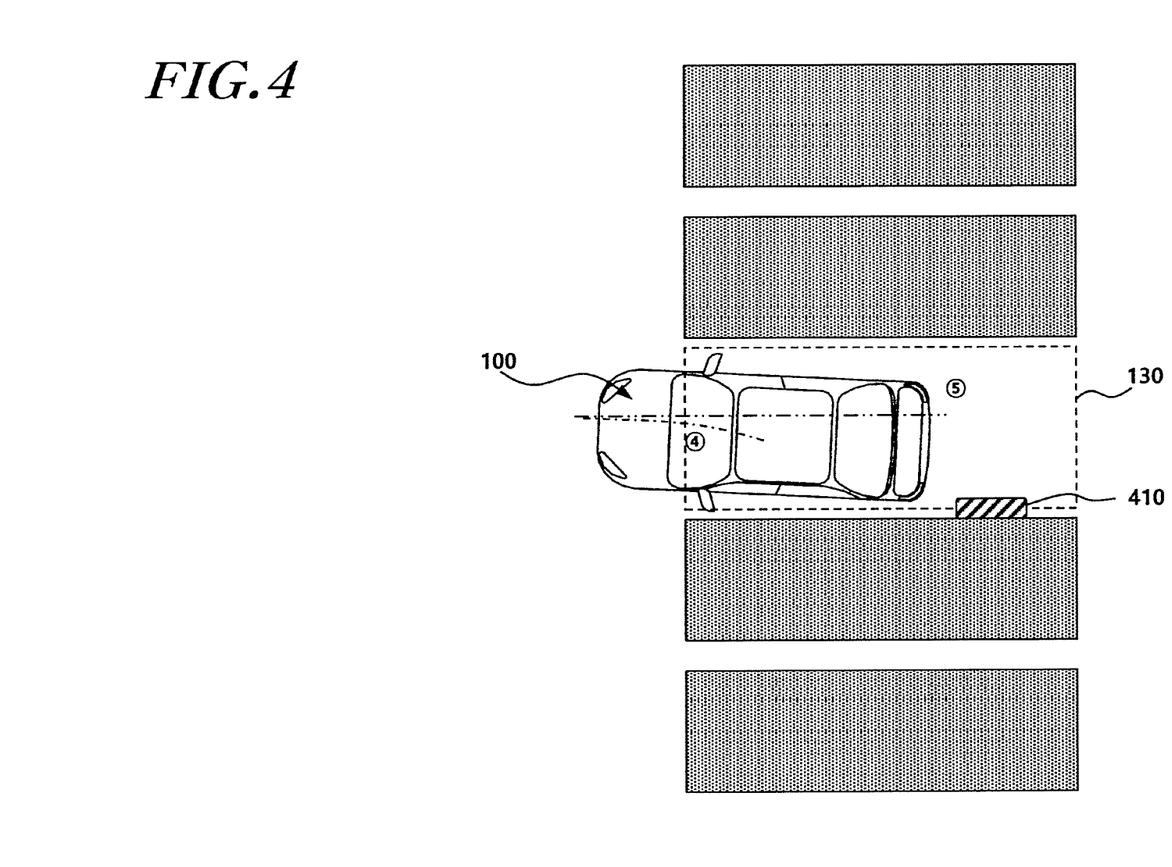
FIG. 4 is a view showing an example of vehicle control when there is a rear object at a side of the rear area in a parking space.

FIG. 4 is a view showing an example of vehicle control when there is an object at a side of the rear area in a parking space.

Referring to FIG. 4, when there is a rear object 410 at a side in the parking space 130, the parking assist system 110, for example, the system controller 210 can park and avoid the rear object 410 by advancing (□) and then reversing (□) the vehicle 100 by controlling the advancing controller 240 and the reversing controller 230.

For example, reversing control is ended on the basis of the distance between the vehicle 100 and the rear object 410, the advancing controller 240 advances again the vehicle 100 (□). Further, the reversing controller 230 controls the vehicle 100 to reverse again after advancing control is ended.

The path through which the vehicle is repeatedly moved may be determined on the basis of a parking path recalculated by the parking space searcher 220 or the system controller 210.

The reversing controller 230 controls the vehicle to reverse until the enter rate of the vehicle 100 to the parking space 130 increases over a predetermined reference value (first reference value). The enter rate is a value calculated using the enter position of the vehicle 100 to the depth of the parking space 130, and when the enter rate is 100%, it means that the vehicle 100 has entered to the end of the parking space 130. The reversing controller 230 controls the vehicle to reverse until the enter rate becomes a first reference value, for example, 85% or more, and the system controller 210 can determine that parking has been finished and end the system, that is, parking control when determining that the vehicle 100 has fully entered the parking space 130 on the basis of the enter rate.

The first reference value that is the reference value of the enter rate where reversing control is ended and it is determined that parking has been finished is not limited to 100% that means the entire depth of the parking space, and it may be set to 85%, depending on standards of countries or vehicle manufacturers.

Meanwhile, it may be difficult to park due to a rear object even though repeating advancing and reversing several times.

Figure 5:
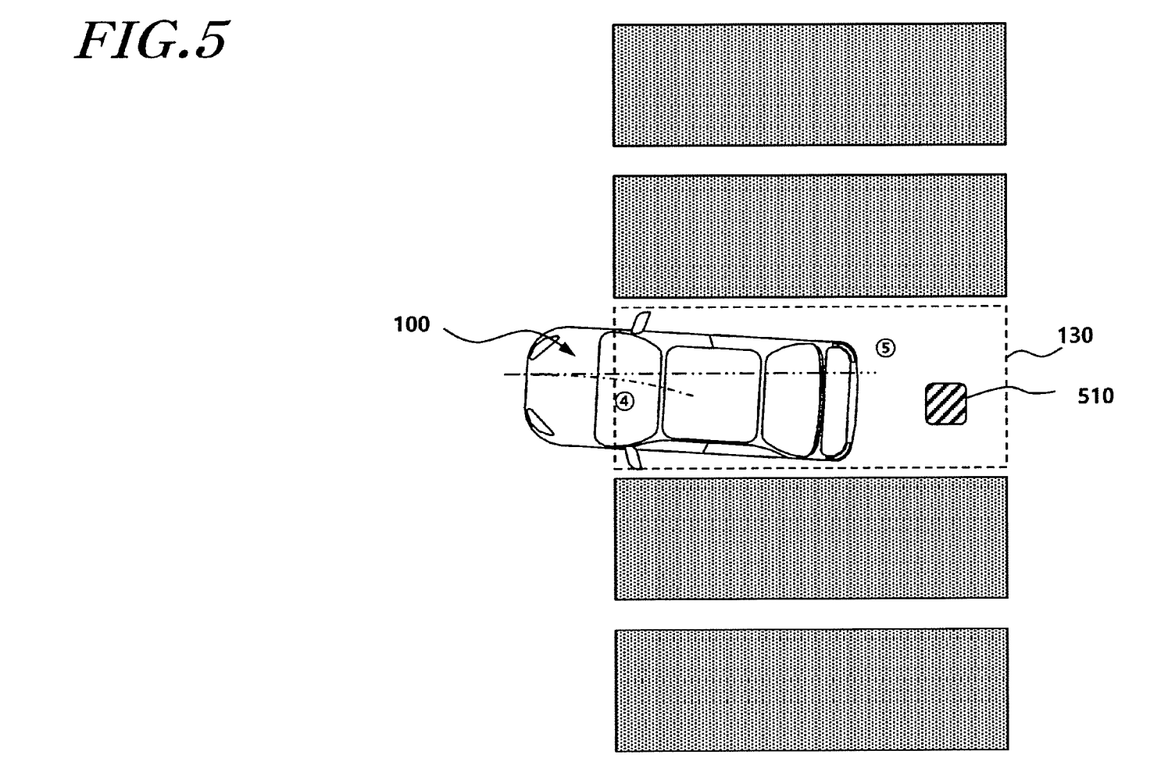
FIG. 5 is a view showing another example of vehicle control when there is an object at a side of the rear area in a parking space.

FIG. 5 is a view showing another example of vehicle control when there is a rear object that is an obstacle around the center of the rear area in a parking space.

FIG. 5 shows a situation when there is a rear object 510 that is an obstacle around the center of the parking space 130 and the parking assist system 110 moves the vehicle 100 several times by controlling the advancing controller 240 and the reversing controller 230, but the vehicle 100 cannot be normally parked in the parking space 130 due to the position of the rear object 510.

For example, some parking assist systems are ended when a vehicle is not completely parked even though they have performed advancing and reversing five times respectively.

Those parking assist systems cannot complete parking even though they have controlled advancing and reversing five times respectively (they have shifted ten times in total) when there is the rear object 510 around the center of the parking space, as shown in FIG. 5, so they inform a driver that parking is impossible and end the operation.

The rear object 510 that is an obstacle existing around the center of the searched parking area or at a position that interferes with completing parking may be an object that was not been sensed in the initial searching of the parking area or an object that did not exist in the process of searching for the parking space and then entered the parking space during parking.

That is, in the situation shown in FIG. 5, parking assist systems of the related art were supposed to repeat advancing and reversing a vehicle several times even though parking was impossible, thus causing a driver to feel anxious. Further, when the rear object 510 is a person, the person feels anxious while the vehicle 100 repeats advancing and reversing several times.

The parking assist system 110 according to an embodiment of the present disclosure ends parking control when determining that it is impossible to avoid the rear object 510 by advancing and reversing and the object 510 cannot be moved in the parking space 130, and in this process, the system uses the position of the rear object when reversing control is ended at each time.

The parking assist system 110 includes the rear object position storage 260 and the system terminator 270 described above with reference to FIG. 2 to perform this function.

The rear object position storage 260 stores the position of the rear object 510 and counts up when reversing control is ended on the basis of the distance between the vehicle 100 and the rear object 510.

That is, a rear obstacle is sensed by the rear sensors during initial reversing control after parking assist is started, and when the distance to the sensed rear object becomes less than a second reference value, reversing control is ended, first position information of the rear object 510 is stored in the storage, and the counter counts up by one.

Further, this operation is performed during second reversing control after the next advancing control.

That is, a rear obstacle is sensed by the rear sensors during second reversing control, and when the distance to the sensed rear object becomes less than a second reference value, reversing control is ended, second position information of the rear object 510 is stored in the storage, and the counter counts up by one.

The system terminator 270 compares the first position information and the second position information that are position values of the rear object before and after a count is increased, and ends parking control when the first position information and the second position information are substantially the same.

The fact that the first position information and the second position information are substantially the same includes not only that the first position information and the second position information are physically completely the same, but that they are within a predetermined tolerance or difference range.

The system terminator 270 may further consider that the counted value of the counter is over a predetermined value (third reference value) to end parking control after comparing the position information of the rear object to check whether the position info nation is the same.

For example, if the third reference value of the counting value is set to 2, the system terminator 270 can end parking control when the first position information and the second position information of the rear object sensed in first reversing control and second reversing control are substantially the same as the result of comparing. Further, if the third reference value of the counting value is set to 3, the system terminator 270 can end parking control when the second position information and the third position information of the rear object sensed in second reversing control and third reversing control are substantially the same.

The third reference value of the counting value for ending the parking control may be set in advance in consideration of the convenience for a driver and continuity of the parking control or may be set by a driver.

For example, when the third reference value of the counting value is set low, driver's anxiety during parking assistance may be reduced, but parking control may be frequently ended. In contrast, when the third reference value of the counting value is set high, driver's anxiety would be increased, but the possibility of complete parking is increased.

The rear object 510 that is defined in this embodiment as an obstacle existing around the center of the searched parking area or at a position that interferes with completing parking may be an object that has not been sensed in the initial searching of the parking area or an object that did not exist in the process of searching for the parking space and then entered the parking space during parking.

Because only the corners of obstacles at the entry of a parking space are substantially considered in the process of searching for the parking space, obstacles existing deep in the parking space may not be sensed.

Further, an obstacle that did not exist in the process of searching for a parking space, but may have entered the parking space later during parking process may be a shopping cart, a person (child), or an animal (feral cat) etc.

Accordingly, using the configuration of ending parking control in consideration of the position information of a rear object in the process of assisting parking and the counted value showing the number of ending reversing control, it is possible to keep assisting parking when the rear object moves or moves out of the parking space while reversing parking is performed two times.

Further, if the rear object is a fixed obstacle, the system ends parking control after performing reversing control only two or three times without advancing/reversing a vehicle over five times as in existing parking assist systems, whereby it is possible to reduce a driver's anxiety.

The position information of a rear object and the count may be reset before parking assistance is started. For example, the position of a rear object that is stored in the rear object position storage 260 may be reset before, while, or after the parking space searcher 220 searches for a parking space. Further, the count may also be reset.

Accordingly, when reversing control is ended, the position of the rear object 510 is stored, and count is increased initially on the basis of the distance between the rear object 510 and the vehicle 100, the position of the rear object 510 is changed before and after a counter is increased, so the system terminator 270 does not end parking control.

In this case, the advancing controller 240 controls the vehicle 100 to advance one more time, and when the advancing control is finished, the reversing controller 230 controls the vehicle 100 to reverse again.

When a rear object is positioned as in FIG. 4, the vehicle 100 is normally parked in the parking space through the additional advancing control and reversing control.

However, when a rear object 510 is positioned as in FIG. 5, the rear object 510 is recognized as it remains at the same position by the rear sensors 120*b* of the vehicle even through the additional advancing control and reversing control.

In this case, the rear object position storage 260 stores the position information of the rear object 510 and increases the count again, and since the position of the rear object 510 is not changed before and after a count is increased, the system terminator 270 ends the parking control.

If the position of the rear object 510 is changed, the system terminator 270 does not ends the parking control and the parking assist system 110 attempts again to park the vehicle 100 using the advancing controller 240 and the reversing controller 230. The fact that the position of the rear object 510 is changed means that the possibility of the object 510 having moved out of the parking space 130 is high, so when the rear object 510 gets out of the parking space 130, the vehicle 100 can be normally parked in the parking space 130.

However, even if the rear object 510 is a movable object, it may remain in the parking space 130, so the system terminator 270 may end the parking control when the count exceeds a predetermined reference value—for example—three times.

The system controller 210, parking space searcher 220, reversing controller 230, advancing controller 240, rear object recognizer 250, rear object position storage 260, system terminator 270 etc. of the parking assist system 110 according to the embodiment may be implemented as a partial module of an integrated controller or an ECU in a vehicle.

Such an automotive integrated controller or ECU may include a processor, a storage device such as a memory, and computer programs that can perform specific functions, and the system controller 210, parking space searcher 220, reversing controller 230, advancing controller 240, rear object recognizer 250, rear object position storage 260, system terminator 270 etc. of the parking assist system 110 may be implemented as software modules that can perform their own functions.

Figure 6:
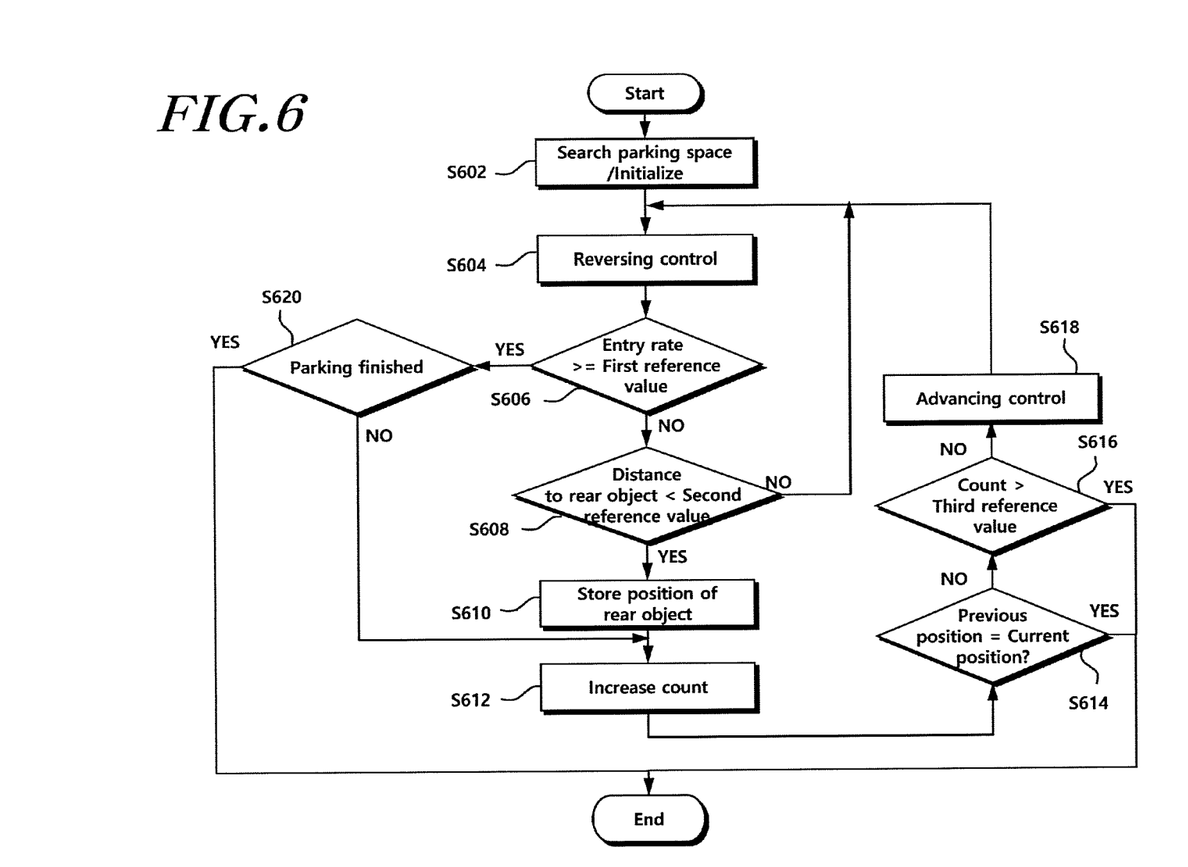
FIG. 6 is a flowchart showing a parking assist method according to an embodiment of the present disclosure.

FIG. 6 is a flowchart showing a parking assist method according to an embodiment of the present disclosure.

Referring to FIG. 6, the parking assist system 110 searches for a parking space through the side sensors 120*a* (S602).

Before, while, or after searching for the parking space, the parking assist system 110 may reset basic variables. The parking assist system 110 can reset the position of a rear object and the count of the counter.

After searching for the parking space, the parking assist system 110 controls the vehicle to reverse along a calculated parking path (S604). Depending on embodiments, it may be possible to not start with reversing control, but perform advancing control first and then perform reversing control.

In the present disclosure, the first reversing control that is ended due to a rear object may be referred to as primary reversing control and the reversing control after the primary reversing control and primary advancing control may be referred to as secondary reversing control.

The primary reversing control may be continued until the entry rate to the parking space becomes first reference value, for example, 85% or more.

During the primary reversing control, the parking assist system 110 checks whether the entry rate of the vehicle 100 reaches the first reference value (S606), and when the entry rate of the vehicle 100 does not reach the first reference value (NO in S606), the vehicle 100 keeps being controlled to reverse if the distance between the rear object and the vehicle 100 is not a second reference value, for example, 30 cm.

The parking assist system 110 recognizes a rear object in a parking space through the rear sensors 120*b*, and when recognizing a rear object, the parking assist system 110 compares the distance between the vehicle 100 and the rear object with the second reference value (S608), and when the distance between the vehicle 100 and the rear object is over the second reference value (NO in S608), the parking assist system 110 keeps the primary reversing control (S604).

When a rear object is recognized and the distance between the vehicle 100 and the rear object is smaller than the second reference value (YES in S608), the parking assist system 110 ends the primary reversing control.

Further, the parking assist system 110 stores the first position information that is the position information of the rear object when the primary reversing control is ended in the rear object position storage 260 (S610) and increases the count of the counter (S612).

Further, the parking assist system 110 compares the positions of the rear object before and after the count is increased to check whether the positions are the same (S614), and when the position information of the rear object is substantially the same as the result of comparing the position information (YES in S614), the system (the parking control) is ended.

The fact that the position information of the rear object is substantially the same before and after the count is increased includes not only that the first position information and the second position information are physically completely the same, but that they are within a predetermined tolerance or difference range.

When the primary reversing control that is the initial reversing control is ended due to a rear object, the first position information of the rear object is initially stored. Further, since there is no previous position information of the rear object, the process goes to "NO" in step S614, and since the count is also under the third reference value, the process goes to S618 for advancing control.

The secondary reversing control is performed after the step S618 for the primary advancing control, and the steps S606 to S610 are performed in the same way even during the secondary reversing control.

Accordingly, when the rear object still remains within the distance of the second reference value even during the secondary reversing control, the secondary reversing control is ended and the second position information of the rear object is stored.

Next, the parking assist system 110 compares the first position information and the second position information that are the position information of the rear object before and after the count is increased two in the step S614 for comparing positions of a rear object, and when the first position information and the second position information are substantially the same (YES in step S614), the parking control is ended or the parking assist system is terminated.

Obviously, when the distance to the rear object is under a second critical value in the step S608 shown in FIG. 6, the system may not immediately store the position information of the rear object, but perform first the step S614 for checking whether the previously stored position information of the rear object is the same as the newly measured position information, and then the steps S610 and S612 for storing the newly measure position information and increasing the count.

Further, it may be possible to store the second position information first in a specific cash memory different from the storage keeping the previous first position information, compare the second position information with the previous first position information, and then update the first position information in the storage with the second position information.

Further, it may be possible to update and store the second position information only when the second position information of the rear object after the count is increased is the same as the first position information before the count is increased, and when the second position information is different from the first position information, it may be possible to determine that the rear object has moved and reset the count value of the counter without separately storing the second position information.

When the position information of the rear object is different before and after the count is increased (NO in step S614), the parking assist system 110 compares the count with the third reference value—for example—three times (S616).

When the count is the third reference value or more (YES in S616), the parking assistant system 110—the parking control—is ended.

When the count is the third reference value or less and the position of the rear object is changed before and after the count is increased, the parking assist system 110 controls the vehicle 100 to advance (S618).

When finishing the advancing control of the vehicle 100, the parking assist system 110 thirdly control the vehicle 100 to reverse, thereby driving the vehicle 100 into the parking space (S604).

When the entry rate of the vehicle 100 becomes the first reference value or more through the third reversing control, the parking assist system 110 determines that parking has been finished (S620). When the parking assist system 110 determines that a parking completion condition has been satisfied, for example, the body of the vehicle 100 has been fully moved in the parking space (YES in S620), parking is finished and the system is ended.

However, when the parking assist system 110 determines that the parking completion condition has not been satisfied (NO in S620), the count may be increased again, and the advancing control (S618) and the reversing control (S604) may be performed again.

Since the initial position information of the rear object and the initial count are reset in this process, when a rear object is initially recognized during parking, the parking assist system 110 can finish parking by advancing and reversing a vehicle again.

However, when a rear object exists at a position that obstructs the vehicle 100 entering a parking space, the parking assist system 110 can store the position of the rear object and recognize that the position of the rear object is not changed, thereby ending early the parking control.

According to an embodiment of the present disclosure, it is possible to remove the problem where repeated advancing control and reversing control cause a driver to feel uncomfortable. Further, it is possible to remove the problem where repeated advancing and reversing cause nearby pedestrians to feel uncomfortable.

Furthermore, when a rear object moves out of a parking space while reversing is performed two times, the parking assist system 110 can recognize the change in position of the rear object and normally park the vehicle 100 in the parking space. These characteristics are distinguished from existing systems that end parking control due to a simple reason that there is an object in a parking space in the related art.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A parking assist system, comprising:
   a rear object recognizer configured to recognize a rear object existing behind a vehicle through rear sensors;
   a reversing controller configured to control the vehicle to reverse until an occupied parking space area in the parking space becomes a first reference value or more, and to end reversing control when the occupied parking space area becomes the first reference value and a distance between the vehicle and the rear object becomes less than a second reference value;
   a rear object position storage configured to store position information of the rear object and increase a count, which is a number of times of ending of the reversing control, when the distance between the vehicle and the rear object is less than the second reference value and the reversing control is ended; and
   a system terminator configured to end parking control when the distance between the vehicle and the rear object before increasing the count is same as a distance between the vehicle and the rear object after the count is increased.

2. The system of claim 1, wherein the rear object position storage resets the count and the position information of the rear object before or while the parking space is searched.

3. The system of claim 1, further comprising an advancing controller configured to control the vehicle to advance when the reversing control is ended on the basis of a condition that the distance between the vehicle and the rear object is less than the second reference value and when the position information of the rear object before and after the count is increased is different.

4. The system of claim 3, further comprising a parking space searcher configured to search the parking space through side sensors,
   wherein the reversing controller controls the vehicle to reverse when the parking space searcher finishes searching for the parking space or the advancing controller finishes advancing control.

5. The system of claim 1, wherein the system terminator ends parking control when the count exceeds a third reference value.

6. The system of claim 1, further comprising a parking space searcher configured to search the parking space through side sensors,
   wherein the parking space searcher calculates the depth of the parking space and the reversing controller calculates the occupied parking space area using an entry position of the vehicle to the depth of the parking space.

7. A parking assist method comprising:
   searching, a parking space searcher, for a parking space through side sensors;
   controlling, by a reversing controller, a vehicle to reverse until an occupied parking space area in the parking space becomes a first reference value or more;
   recognizing, by a rear object recognizer, a rear object in the parking space through rear sensors;
   ending, by the reversing controller, reversing control when the occupied parking space area becomes the first reference value and a distance between the vehicle and the rear object becomes less than a second reference value;
   storing, by a rear object position storage, position information of the rear object and increasing a count when the distance between the vehicle and the rear object is less than the second reference value;
   comparing, by a system terminator, position information of the rear object before and after the count is increased;
   controlling the vehicle to be parked in the parking space when the distance between the vehicle and the rear object before increasing the count is same as a distance between the vehicle and the rear object after the count is increased; and
   ending, by the system terminator, parking control.

8. The method of claim 7, further comprising controlling the vehicle to advance when the position information of the rear object before and after the count is increased is different in the comparing of position information of the rear object,
   wherein the controlling of a vehicle to reverse is performed again when the controlling of the vehicle to advance is finished.

9. The method of claim 7, further comprising ending parking control when the count exceeds a third reference value before and after the storing of position information of the rear object and increasing of a count.

10. The method of claim 7, further comprising resetting the count and the position information of the rear object before or during the searching of a parking space.

11. The method of claim 7, further comprising determining a parking control completion condition when the occupied parking space area becomes the first reference value or more by the controlling of the vehicle to reverse, and increasing the count when the parking control completion condition is not satisfied.

\* \* \* \* \*